(12) United States Patent
Waylett et al.

(10) Patent No.: US 6,931,261 B2
(45) Date of Patent: Aug. 16, 2005

(54) TOWER TOP CELLULAR COMMUNICATION DEVICES AND METHOD FOR OPERATING THE SAME

(75) Inventors: Nicholas S. Waylett, Fremont, CA (US); Kui Lin, Menlo Park, CA (US)

(73) Assignee: InterWave Communications International Ltd., Hamilton (BM)

(*) Notice: Subject to any disclaimer, the term of this patent is extended or adjusted under 35 U.S.C. 154(b) by 522 days.

(21) Appl. No.: 09/940,279

(22) Filed: Aug. 27, 2001

(65) Prior Publication Data

US 2003/0040336 A1 Feb. 27, 2003

(51) Int. Cl.[7] .............................................. H04Q 7/155
(52) U.S. Cl. ........................ 455/561; 455/62; 455/88
(58) Field of Search ............................ 455/56.1, 62, 88

(56) References Cited

U.S. PATENT DOCUMENTS

| 4,685,149 A | 8/1987 | Smith et al. |
| 5,287,544 A | 2/1994 | Menich et al. |
| 6,061,229 A | 5/2000 | Gates et al. |
| 6,255,942 B1 | 7/2001 | Knudsen |
| 6,411,825 B1 * | 6/2002 | Csapo et al. ................ 455/461 |
| 6,701,137 B1 * | 3/2004 | Judd et al. .................. 455/121 |

* cited by examiner

Primary Examiner—Creighton Smith
(74) Attorney, Agent, or Firm—Dorsey & Whitney LLP

(57) ABSTRACT

A communication network (100) and method are provided that reduce loses between a base transceiver station (BTS 102) and an antenna (114). Generally, the network (100) includes a tower (112) having a tower-top (110) on which the antenna (114) is supported, a BTS (102) and a separate amplifier (124) on the tower-top near to the antenna, the amplifier in a communication path between the BTS and the antenna. In one embodiment, the network (100) further includes a backhaul (122) on the tower-top (110) near the antenna (114), the backhaul configured to couple signals between the BTS (102) and a base station controller (BSC 108). Preferably, the backhaul (122) is integrated with the BTS (102). In another version, the backhaul (122) is configured to couple communication signals between the BTS (102) and the BSC (108) via a wireless communication system (128). More preferably, a photovoltaic cell (132) on the tower (112) supplies electrical power to the BTS (102), the amplifier (124) and the backhaul (122), thereby providing a self-contained tower-top node (134).

17 Claims, 4 Drawing Sheets

TOWER TOP CELLULAR COMMUNICATION DEVICES AND METHOD FOR OPERATING THE SAME

TECHNICAL FIELD

The present invention relates generally to cellular communication systems, and more particularly to a tower top base transceiver station having an integrated backhaul and a method for operating the same.

BACKGROUND

The use of mobile communication devices including cellular telephones, pagers and wireless internet access appliances has increased exponentially in recent years. This increased demand for mobile communication devices has led to rapid growth in the infrastructure required to support these services.

A block diagram of a conventional communication network for communicating with cellular or mobile telephones or station, is shown in FIG. 1. Referring to FIG. 1, a conventional communication network 10 for communicating with a mobile station 12 typically includes a mobile switching center (MSC 14) that communicates with a public switched telephone network (PSTN 16) and a number of base station controllers (BSC 18), only one of which is shown. Each BSC 18 in turn communicates with one or more base transceiver stations (BTS 20). The BTS 20 are coupled via a feed cable 22 to one or more antennas 24 mounted on top of a tower 26 and are responsible for transmitting and receiving communication signals between the communication network 10 and the mobile station 12. Each BTS 20 commonly includes one or more transceivers for transmitting and receiving signals, amplifiers for amplifying received and transmitted signals, a duplexor for applying transmitted signals to the antenna 24 and split the received signals onto a receive line, and a backhaul for coupling signals between the BTS and the BSC 18. The mobile switching center 14 operates as the nerve center for the entire network and communicates with the BSC 18 using an established protocol such as, for example, the GSM (Global Systems for Mobile Communications) protocol, the CDMA (Code Division Multiple Access) and the TDMA (Time Division Multiple Access) protocols. These various protocols dictate the nature of the communications between the MSC 14, the BSCs 18, and the BTSs 20 and are well known to those skilled in the art.

Conventional BSCs 18 are primarily responsible for dictating the size of an associated cell. That is, the area covered or served by a particular BTS 20. There are no fixed specifications as to the size of the cells, but in current usage, it is common to refer to macro cells, mini cells, micro cells and pico cells. The range of the various cells tends to vary with their size and by way of example in current usage, macro cells typically have antennas 24 that output on the order of 20–50 watts of energy and tend to have ranges on the order of 5–40 kilometers. Mini cells typically have power outputs on the order of 10 watts and corresponding ranges in the vicinity of 2–5 kilometers. Micro cells typically have power consumption on the order of 2–8 watts with ranges of a kilometer or so. Of course as signal processing capabilities in antenna designs improve, the distinction between the various sizes blurs but in concept, the cell size may always be varied.

One problem frequently encountered by conventional communication networks having the antenna 24 on top of the tower 26 arises from the feed cable 22 coupling communication signals between the BTS 20 and the antenna. In the illustrated arrangement, the antenna 24 is mounted on the top of the tower 26 while the associated BTS 20 is at the base of the tower. Thus, if the tower 26 is tall, a long feed cable 22 must be provided between the BTS and the antenna 24. Moreover, often the BTS 20 is located some distance away from the tower 26 in a location more protected from the environment or more readily accessible by maintenance personnel, further lengthening the feed cable 22. Generally the feed cable 22 includes a pair of coax cables with one coax cable (a transmit line) being arranged to carry the transmit signal and one coax cable (a receive line) being arranged to carry the receive signal. Often, the transmit and receive line can be combined in a single multiplexed feed cable 22. A long feed cable 22 presents several difficulties including significant signal intensity or power losses in both received and transmitted signals, and signal degradation by the introduction of noise to the received signal.

Another problem with conventional communication networks is the difficulty in upgrading or modifying the BTS 20 hardware to alter size and/or shape of a particular cell. For example, as wireless communication technology increases in popularity it is often desirable to reduce the size of a cell to permit the introduction of additional cells in order to handle higher usage. In other instances it is desirable to increase the size of a cell to provide improved range. Although the present designs work well, they are not particularly modular in that if it is desirable to change the size of a cell for any reason, it is necessary to replace the entire BTS 20, rather than just an amplifier, duplexor, backhaul or transceivers contained therein. Conventional BTSs 20 are relatively large and expensive units. Thus, it is desirable to provide a BTS architecture that enables the BTS components to be upgraded, repaired or replaced independently and even reused if the reason for replacement was merely to change cell size or cell geometry.

The present invention provides a solution to these and other problems, and offers other advantages over the prior art.

SUMMARY

It is an object of the present invention to provide a communication system or network having a tower-top amplifier, base transceiver station and backhaul and a method for operating the same.

In one aspect, the present invention is directed to a base transceiver station (BTS) for communicating with a mobile station through an antenna supported on a top of a tower in a cellular communication system. Generally, the BTS is configured to be affixed to the tower-top in a location proximal to the antenna, thereby reducing losses associated with coupling communication signals between the antenna and the BTS. Preferably, the BTS reduces losses associated with coupling communication signals between the antenna and the BTS by at least 3 dB over a cellular communication system in which the BTS is not affixed to the tower-top in a location proximal to the antenna. More preferably, the BTS is capable of providing an outgoing communication signal from the antenna having a power of at least about 40 dBm, and most preferably of at least about 27 dBm.

In one embodiment, the cellular communication system further includes a base station controller (BSC), and the BTS includes: (i) at least one transceiver adapted to communicate with the mobile station through the antenna; (ii) a power amplifier in a communication path between the transceiver and the antenna, the power amplifier adapted to amplify outgoing communication signals received from the BSC, and to output amplified communication signals; and (iii) a power supply for supplying power to the power amplifier and the transceiver. Integrating the power amplifier into the tower-top BTS and providing a common power supply reduces the size, complexity, cost and electrical power consumption of the BTS over a cellular communication systems having a separate power amplifier at the tower-top and BTS located elsewhere. Optionally, the BTS can further include a duplexer for coupling amplified communication signals from the power amplifier to the antenna, and coupling incoming communication signals from the antenna to the transceiver.

In another embodiment, the BTS further includes a backhaul for coupling communication signals between the BTS and the BSC. In one version of this embodiment, the backhaul is configured to couple communication signals between the BTS and the BSC via a wireless communication system. In another version, the BTS receives power from at least one photovoltaic cell affixed to the tower to provide a self-contained tower-top node.

In another aspect, the present invention is directed to a communication network including: (i) an antenna; (ii) a tower having a tower-top on which the antenna is supported; (iii) a base transceiver station (BTS) affixed to the tower-top in a location proximal to the antenna, the BTS having at least one transceiver configured to communicate with a mobile station through the antenna; and (iv) an amplifier affixed to the tower-top in a location proximal to the antenna, the amplifier in a communication path between the BTS and the antenna, and separate and distinct from the BTS, the amplifier configured to amplify and filter communication signals passed between the BTS and the mobile station. Preferably, the communication network reduces losses associated with coupling communication signals between the BTS and the amplifier, and between the amplifier and the antenna are reduced by at least 3 dB over a communication network not having a BTS and an amplifier affixed to the tower-top in a location proximal to the antenna. More preferably, the amplifier is capable of providing an outgoing communication signal from the antenna having a power of at least about 40 dBm, and most preferably of at least about 39 dBm.

In one embodiment, the communication network further includes a base station controller (BSC), and a backhaul affixed to the tower-top in a location proximal to the antenna, the backhaul configured to couple communication signals between the BTS and the BSC. In one version of this embodiment, the backhaul is integrated with the BTS. In another version, the backhaul is configured to couple communication signals between the BTS and the BSC via a wireless communication system.

In another embodiment, the communication network further includes at least one photovoltaic cell affixed to the tower for supplying electrical power to the BTS, the amplifier and the backhaul, thereby providing a self-contained tower-top node.

In still another aspect, the present invention is directed to a method for facilitating communication with a mobile station in a communication network having an antenna supported on a top of a tower. Generally, the method includes the steps of: (i) providing a base transceiver station (BTS) affixed to the top of the tower in a location proximal to the antenna, the BTS having at least one transceiver configured to communicate with a mobile station through the antenna; (ii) providing an amplifier affixed to the top of the tower in a location proximal to the antenna, the amplifier in a communication path between the BTS and the antenna, and separate and distinct from the BTS, the amplifier configured to amplify and filter communication signals passed between the BTS and the mobile station; (iii) operating the at least one transceiver to communicate with the mobile station; and (iv) amplifying and filtering communication signals passed between the BTS and the mobile station. As noted above losses associated with coupling communication signals between the BTS and the amplifier, and between the amplifier and the antenna are reduced over a communication network not having a BTS and an amplifier affixed to the top of the tower in a location proximal to the antenna. Preferably, losses associated with coupling communication signals between the antenna and the BTS are reduced by at least 3 dB. More preferably, the step of amplifying and filtering communication signals passed between the BTS and the mobile station involves the step of transmitting an outgoing communication signal from the antenna having a power of at least 39 dBm.

In one embodiment, the communication network further includes a base station controller (BSC), and a backhaul affixed to the top of the tower in a location proximal to the antenna and configured to couple communication signals between the BTS and the BSC, and the method involves the further step of coupling communication signals between the BTS and the BSC using the backhaul. In one version of this embodiment, the backhaul is configured to couple communication signals between the BTS and the BSC via a wireless communication system, and the step of coupling communication signals between the BTS and the BSC using the backhaul is accomplished by coupling communication signals between the BTS and the BSC via the wireless communication system.

In another embodiment, the communication network further includes at least one photovoltaic cell affixed to the tower, and the method involves the further step of supplying electrical power to the BTS, the amplifier and the backhaul from the photovoltaic cell.

Advantages of the communication network and method of the present invention include any one or all of the following:
  (i) reduced losses associated with coupling communication signals between the BTS and the amplifier, and between the amplifier and the antenna over a communication network not having a BTS and an amplifier affixed to the tower-top in a location proximal to the antenna;
  (ii) an outgoing communication signal from an antenna of a tower-top node having a power of at least 39 dBm;
  (iii) improved received sensitivity due to significant reduction in overall noise achieved by minimizing losses between the antenna and receive system;
  (iv) modular architecture facilitating repair, upgrade and repair of one of the amplifier, BTS and backhaul independent of the other modules; and
  (v) a self-contained node capable of operating independent from a connection to public power line or a land based communication line to a base station controller.

BRIEF DESCRIPTION OF THE DRAWINGS

These and various other features and advantages of the present invention will be apparent upon reading of the following detailed description in conjunction with the accompanying drawings, where.

DETAILED DESCRIPTION

The present invention is directed to a communication system or network having a tower-top amplifier, base transceiver station (BTS) and backhaul and a method for operating the same to provide reduced loses between the BTS and an antenna supported by the tower, and to provide a higher power to outgoing signals transmitted from the antenna.

Figure 1:
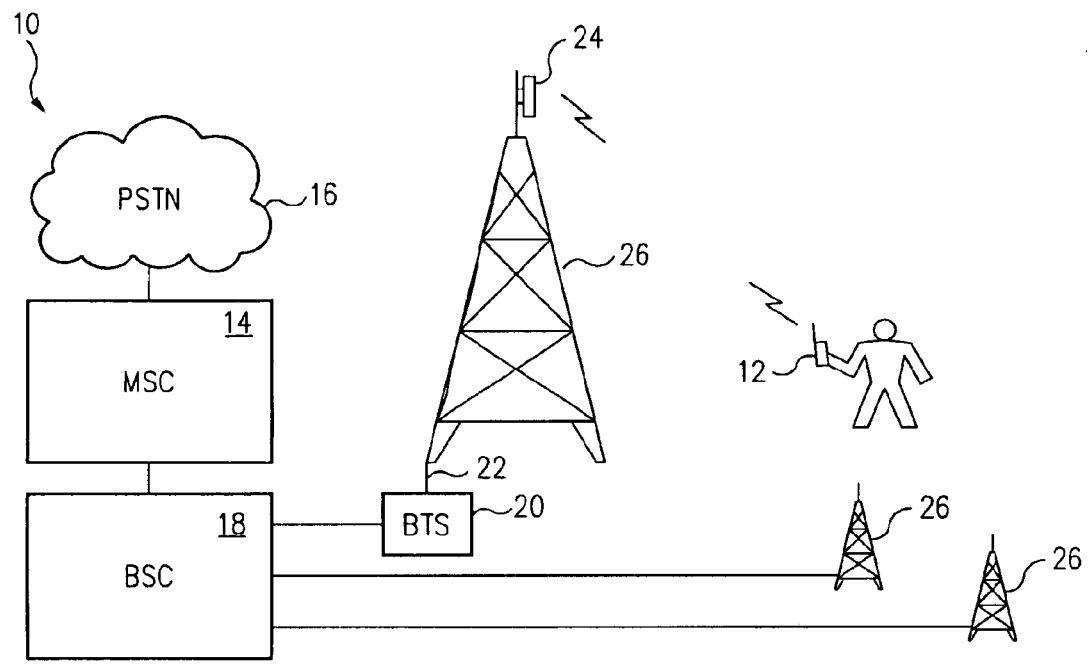
FIG. 1 (prior art) is a block diagram of a conventional communication network.
Figure 2:
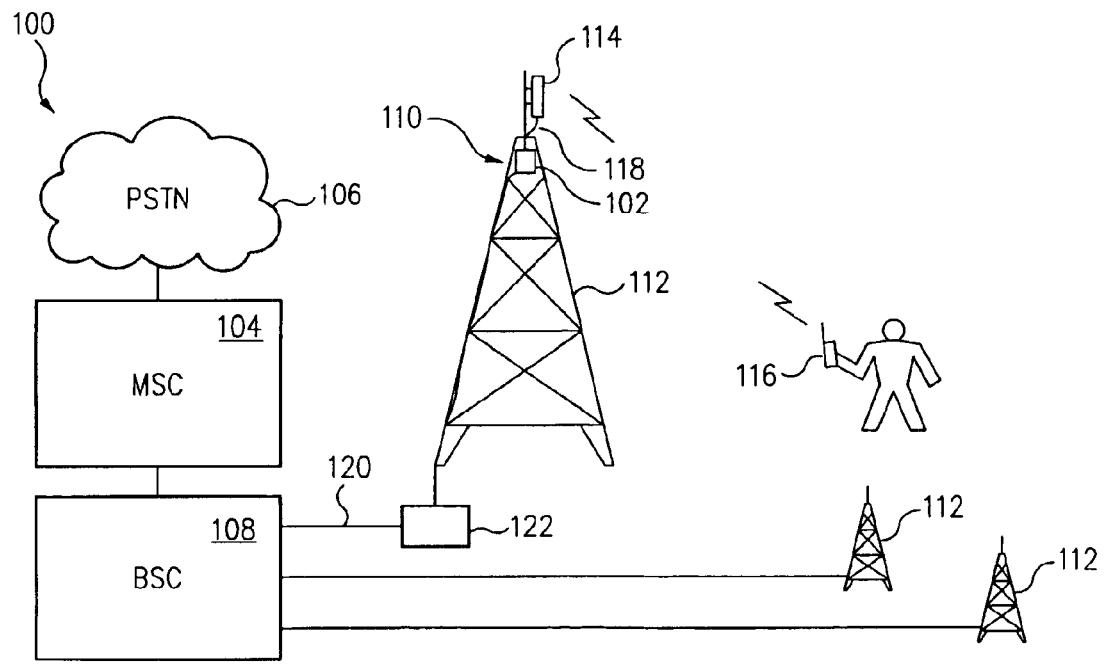
FIG. 2 is a block diagram of a communication network having a tower-top BTS according to an embodiment of the present invention.

A communication network according to the present invention will now be described with reference to FIG. 2. FIG. 2 is a block diagram of a communication network 100 having a tower-top or pico BTS 102 according to an embodiment of the present invention. For purposes of clarity, many of the details of communication networks 100 that are widely known and are not relevant to the present invention have been omitted. Referring to FIG. 2, communication network 100 generally includes: a mobile switching center (MSC 104) that is coupled to and communicates with a public switched telephone network (PSTN 106), and/or the Internet (not shown), and a number of base station controllers (BSC 108), only one of which is shown. Each BSC 108 in turn communicates with one or more BTSs 102.

In accordance with the present invention, BTS 102 are mounted or affixed on a tower-top 110 of a tower 112, which also supports one or more antennas 114 for transmitting and receiving communication signals between the communication network 100 and a mobile station 116. BTS 102 is coupled to antenna 114 through an antenna-line 118, such as a co-axial cable, and to BSC 108 via a land-line 120. Land-line 120 includes a twisted pair or a fiber optic link, but can also include a co-axial cable or an E1/T1 line or trunk, and may include a pathway over PSTN 106 or an internet protocol network.

Preferably, BTS 102 is completely contained within a module measuring less than 12 inches square and 1 to 2 inches deep, as compared with a conventional BTS which is typically 3 feet tall, 2 feet wide and 2 feet deep. This modular architecture facilitates installation, repair, upgrade and replacement of BTS 102, providing a significant cost advantage over conventional systems. Generally, each BTS 102 includes: one or more transceivers (not shown) for transmitting communication signals to and receiving communication signals from mobile station 116; amplifiers (not shown, for amplifying received and transmitted communication signals; and a duplexor (not shown) for coupling outgoing communication signals to antenna 114 and coupling received incoming communication signals to the transceivers. The amplifiers in BTS 102 can include a low noise amplifier, for amplifying and/or filtering an incoming communication signal coupled between antenna 114 and the transceivers, and a power amplifier for amplifying an outgoing communication signal coupled from the transceiver to the antenna.

Affixing BTS 102 to tower-top 110 of tower 112 in a location or position near or proximal to antenna 114 significantly reduces the length of antenna-line 118, thereby significantly reducing losses associated with coupling communication signals between the antenna and the BTS. Preferably, BTS 102 reduces losses associated with coupling communication signals between antenna 114 and the BTS by at least 3 dB over a cellular communication system in which the BTS is not affixed to the tower-top in a location proximal to the antenna. More preferably, by locating BTS 102, including the power amplifier for amplifying outgoing communication signals therein, on tower 112 near or proximal to antenna 114 provides an outgoing communication signal from the antenna having a higher power than possible with conventional systems having an amplifier with comparable gain. Most preferably, BTS 102 is capable of providing an outgoing communication signal from antenna 114 having a power of from at least about 27 dBm to at least 40 dBm.

In addition, communication network 100 further includes a backhaul 122 for interfacing between the BTS and BSC 108, and for coupling communication signals over land-line 120. Backhaul 122 can be integrated within BTS 102 or separate therefrom as shown. Generally, backhaul 122 includes circuits for adapting rate of communication signals used in BTS 102 to that of communication signals transferred over land-line 120, and for converting between different protocols used in the BTS and BSC 108.

Electrical power to backhaul 122, BTS 102 and to the transceivers, amplifiers, and duplexors therein, is supplied from a power supply (not shown), which may be integrated in the BTS or located elsewhere on or near tower 112. The power supply in turn generally receives power from a conventional external power source, such as a line from an electric power or utility company.

Figure 3:
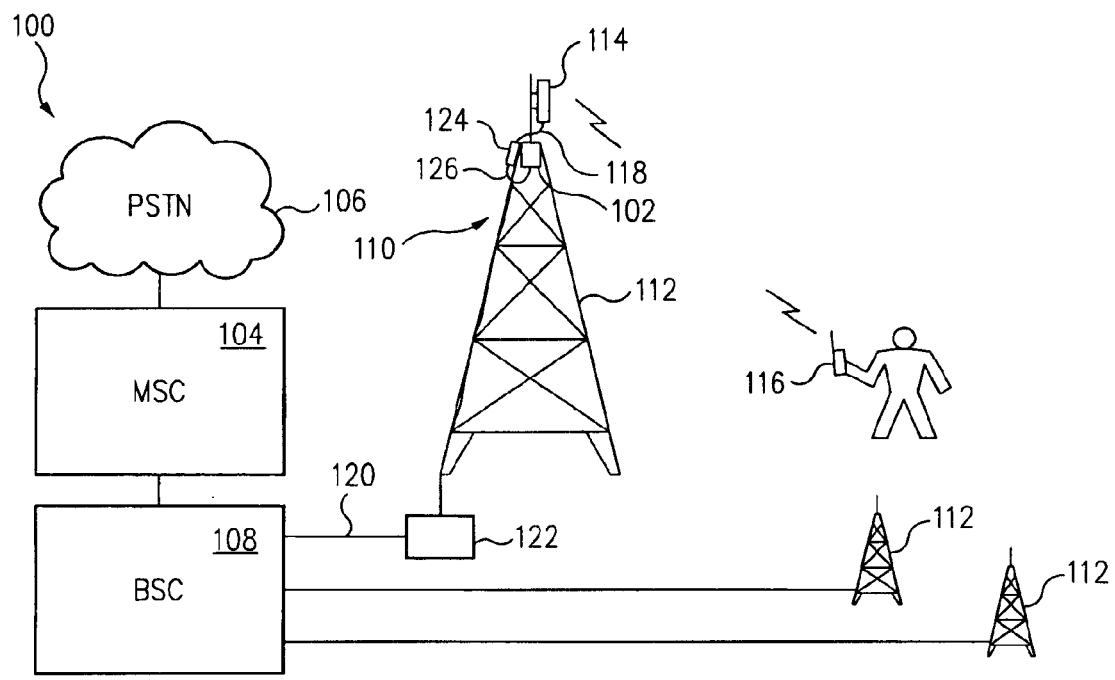
FIG. 3 is a block diagram of a communication network having a tower-top amplifier and BTS according to an embodiment of the present invention.

FIG. 3 is a block diagram of another embodiment of a communication network 100 according to the present invention having a tower-top BTS 102 and a tower-top amplifier or amplifier 124. Generally, the embodiment of communication network 100 shown in FIG. 3, similar to the embodiment in FIG. 2 described above, includes an MSC 104, a number of BSCs 108, only one of which is shown, a number of BTSs 102 and associated towers 112 with at least one antenna 114 supported thereon. However, in the embodiment of FIG. 3, communication network 100 further includes a separate power amplifier, amplifier 124, mounted or affixed on tower-top 110 of tower 112 in a location or position near or proximal to antenna 114 for amplifying outgoing communication signals coupled from the transceiver in BTS 102 to the antenna. Amplifier 124 is coupled to antenna 114 via antenna-line 118 and to BTS 102 via a short feed-line 126. Amplifier 124 can be in place of or in addition to an internal power amplifier contained within BTS 102. Because of the power demands and heat dissipation requirements of large or high-gain power amplifiers, providing an amplifier 124 separate and distinct from BTS 102 enables use of larger a amplifier for greater gain and a smaller BTS. Preferably, the amplifier is capable of providing an outgoing communication signal from the antenna having a power of at least about 39 dBm. More preferably, locating amplifier 124 near to antenna 114 and to BTS 102 reduces losses associated with coupling communication signals between the BTS and the amplifier, and between the amplifier and the antenna by at least 3 dB over a communication network not having a BTS and an amplifier affixed to the tower-top in a location proximal to the antenna. Moreover, minimizing losses between the antenna 114 and the receive system or receiver (not shown) in the BTS 102 improves received sensitivity, and the overall noise figure is significantly reduced by an amount equivalent to the loss that would be realized between the antenna and the receiver in a conventional system.

Figure 4:
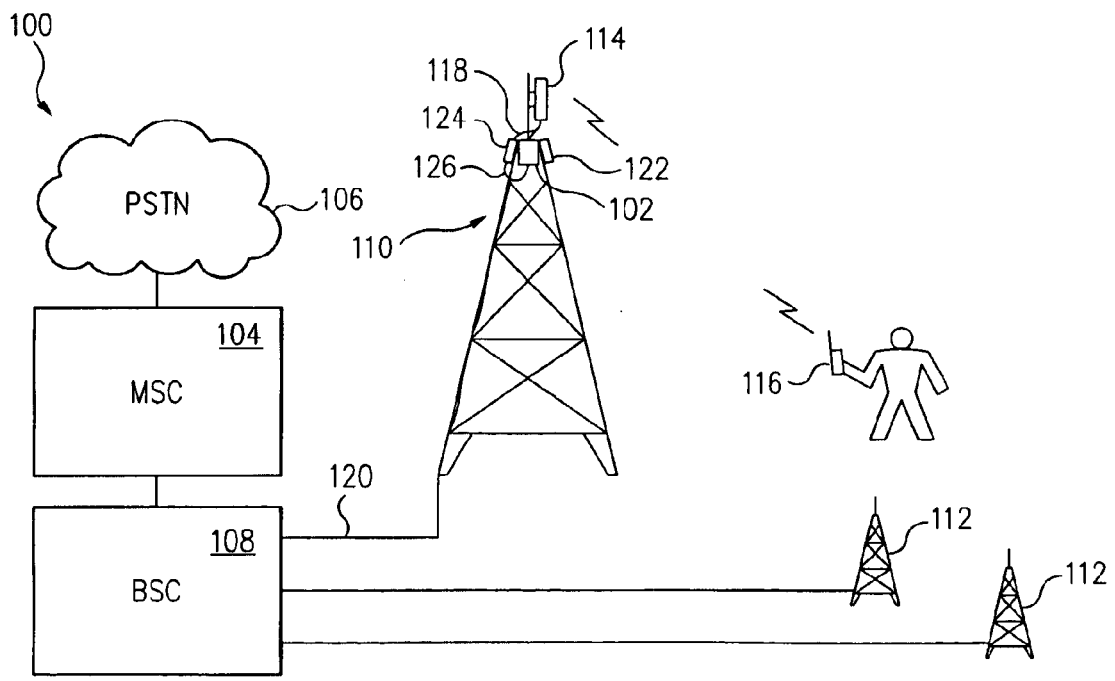
FIG. 4 is a block diagram of a communication network having a tower-top amplifier, BTS and backhaul according to an embodiment of the present invention.
Figure 5:
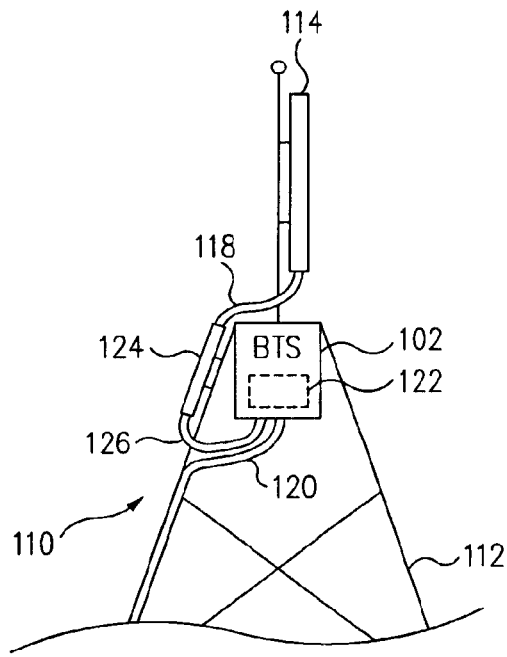
FIG. 5 is a partial block diagram of a communication network showing a tower-top amplifier, BTS with an integrated backhaul according to an embodiment of the present invention.

FIG. 4 is a block diagram of a communication network 100 having a tower-top amplifier 124, BTS 102 and backhaul 122 according to an embodiment of the present invention. The embodiment of communication network 100 shown in FIG. 4, differs from that described above in that backhaul 122 is also located on tower-top 110 of tower 112 near or proximal to antenna 114 and BTS 102, thereby reducing or eliminating losses and/or degradation in communication signals coupled between the backhaul and the BTS. In a preferred embodiment, shown in FIG. 5 backhaul 122 is integrated within BTS 102.

Figure 6:
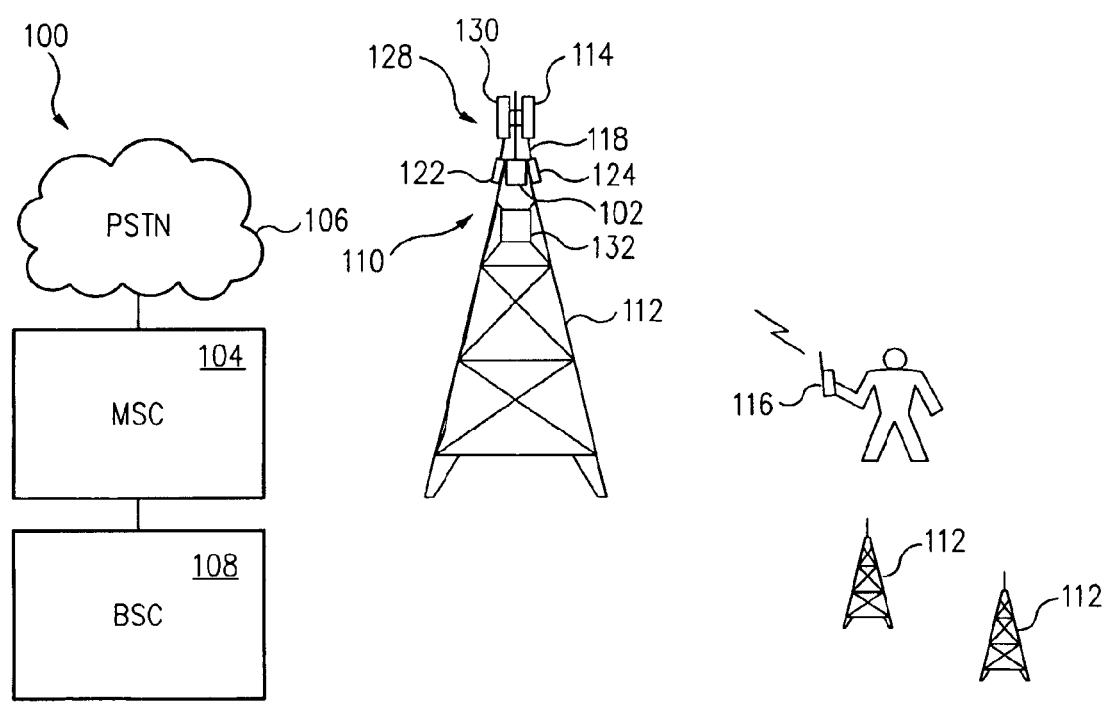
FIG. 6 is a block diagram of a communication network having a tower-top backhaul coupled to a base station controller via wireless communication system according to an embodiment of the present invention.

FIG. 6 is a block diagram of yet another embodiment of a communication network 100 according to the present invention having a tower-top backhaul 122 coupled to BSC 108 via a wireless communication system. Generally, communication system 100 includes tower-top BTS 102, amplifier 124 and backhaul 122, all separate and distinct from one another, and all mounted or affixed to tower-top 110 of tower 112 in a location or position near or proximal to antenna 114. Backhaul 122 couples communication signals from BTS 102 to BSC 108 via a wireless communication system 128 including a directional antenna or antenna 130, thereby eliminating land-line 120. Elimination of land-line 120 enables tower 112 and BTS 102 associated therewith to be separated from a network of provider land-lines linking other BTSs and BSC 108. Additionally, it allows a more rapid creation of a micro cell to expand capacity within an existing macro cell to meet an increase in demand. Although backhaul 122 is shown as separate from BTS 102, it will be appreciated that the above embodiment is also applicable to communication networks 100 wherein the backhaul is integrated with the BTS.

Optionally, communication system 100 can further include a solar or photovoltaic cell 132 or an array of photovoltaic cells, on tower 112 and a battery (not shown) to provide electrical power to BTS 102, amplifier 124 and backhaul 122, thereby eliminating the need for a connection to an electrical power line. Eliminating the need for a connection to an electrical power line provides a self-contained tower-top node 134 that can be located in areas geographically separated from utilities and the network of provider land-lines, in areas heretofore not serviced by communication networks 100. Power requirements for each of the BTS 102, amplifier 124, and backhaul 122 are from about 20 to about 35 watts, depending on the desired range or size of the associated cell, well within the capacity of commercially available photovoltaic cells 132 and batteries.

Figure 7:
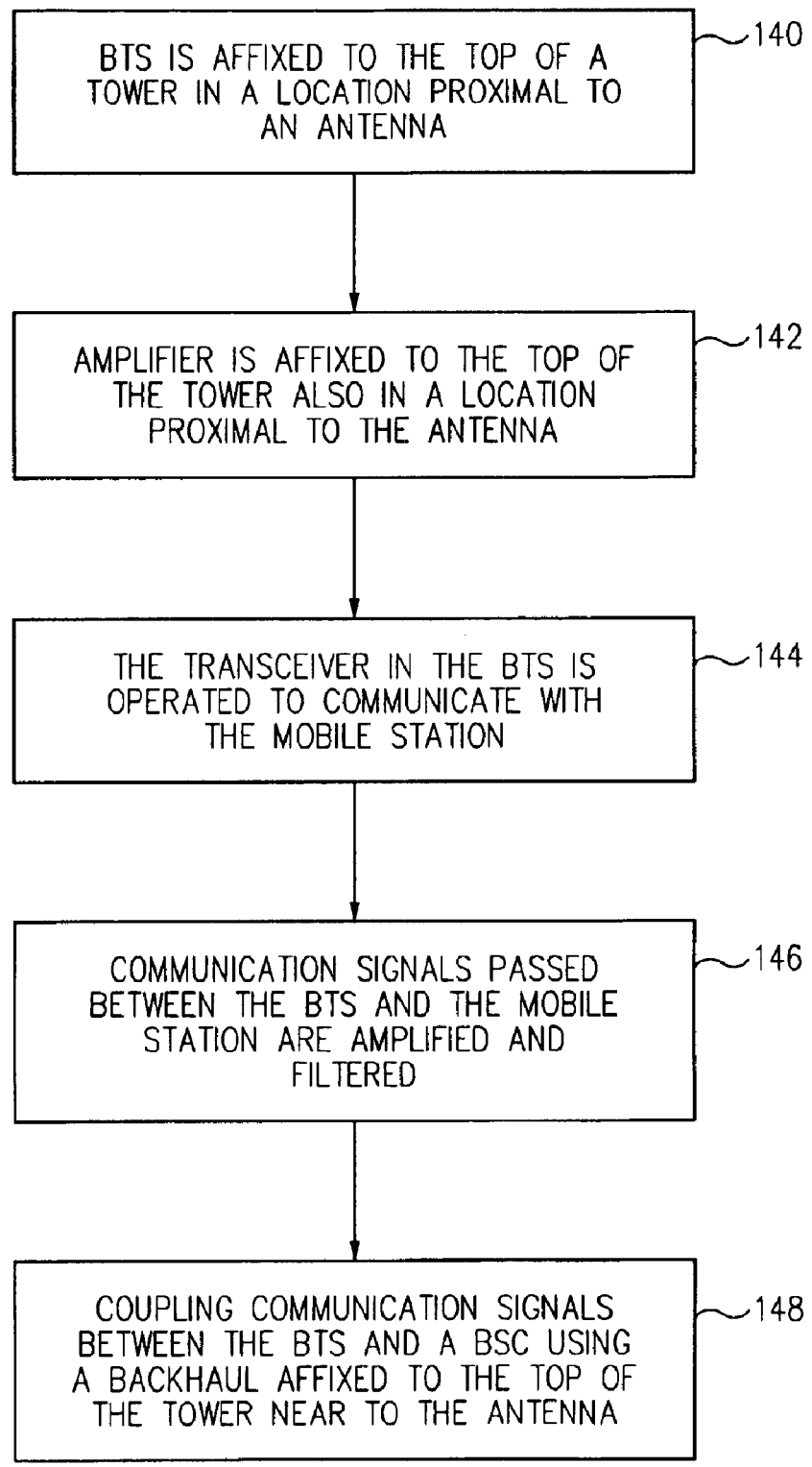
FIG. 7 is a flow chart showing steps of a method for facilitating communication with a mobile station using a tower-top node according to an embodiment of the present invention.

A method or process for operating communication network 100 according to an embodiment of the present invention will now be described with reference to FIG. 7. FIG. 7 is a flowchart showing steps of a method for facilitating communication with mobile station 116 using a communication network having a tower-top BTS 102, amplifier 124 and/or backhaul 122. In the method, BTS 102 is affixed to tower-top 110 of tower 112 in a location proximal to antenna 114 (step 140). BTS 102 has at least one transceiver configured to communicate with mobile station 116 through antenna 114. Amplifier 124 is also affixed to tower-top 110 of tower 112 in a location proximal to antenna 114 (step 142). Amplifier 124 is in a communication path between BTS 102 and antenna 114, and is configured to amplify and filter communication signals passed between the BTS and mobile station 116. The transceiver in BTS 102 is operated to communicate with mobile station 116 (step 144), and communication signals passed between the BTS and the mobile station are amplified and filtered (step 146).

Preferably, losses associated with coupling communication signals between antenna 114 and BTS 102 are reduced by at least 3 dB over conventional communication networks not having tower-top BTSs and amplifiers. More preferably, the step of amplifying and filtering communication signals passed between BTS 102 and mobile station 116, step 146, involves the step of transmitting an outgoing communication signal from antenna 114 having a power of at least 39 dBm.

In one embodiment, the method involves the further step of coupling communication signals between BTS 102 and BSC 108 using a backhaul 122 affixed to tower-top 110 of tower 112 near to antenna 114 (step 148). In one version of this embodiment, the step of coupling communication signals between BTS 102 and BSC 108 using backhaul 122, step 148, is accomplished by coupling communication signals between the BTS and the BSC via wireless communication system 128.

Optionally, the method further includes the initial step (not shown) of supplying electrical power to BTS 102, amplifier 124 and backhaul 122 from a photovoltaic cell 132 affixed to tower 112.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. A base transceiver station (BTS) for communicating with a mobile station through an antenna supported on a top of a tower in a cellular communication system, the BTS configured to be affixed to the tower-top in a location proximal to the antenna, whereby losses associated with coupling communication signals between the antenna and the BTS are reduced, and the BTS is configured to received electrical power supplied by at least one photovoltaic cell affixed to the tower, such that a self-contained tower-top node is provided.

2. A BTS according to claim 1, wherein the BTS reduces losses associated with coupling communication signals between the antenna and the BTS by at least 3 dB over a cellular communication system in which the BTS is not affixed to the tower-top in a location proximal to the antenna.

3. A BTS according to claim 2, wherein the BTS is capable of providing an outgoing communication signal from the antenna having a power of at least 27 dBm.

4. A BTS according to claim 1, wherein the cellular communication system further includes a base station controller (BSC), and wherein the BTS comprises:

at least one transceiver adapted to communicate with the mobile station through the antenna;

a power amplifier in a communication path between the at least one transceiver and the antenna, the power amplifier adapted to amplify outgoing communication signals received from the BSC, and to output amplified communication signals; and a power supply for supplying power to the power amplifier and the at least one transceiver, whereby the size, complexity and electrical power consumption of the BTS are reduced.

5. A BTS according to claim 4, wherein the BTS further comprises a backhaul configured to couple communication signals between the BTS and the BSC.

6. A BTS according to claim 5, wherein the backhaul is configured to couple communication signals between the BTS and the BSC via a wireless communication system.

7. A communication network comprising:

an antenna;

a tower having a tower-top on which the antenna is supported;

a base transceiver station (BTS) affixed to the tower-top in a location proximal to the antenna, the BTS having at least one transceiver configured to communicate with a mobile station through the antenna;

an amplifier affixed to the tower-top in a location proximal to the antenna, the amplifier in a communication path between the BTS and the antenna, and separate and distinct from the BTS, the amplifier configured to amplify and filter communication signals passed between the BTS and the mobile station; and at least one photovoltaic cell affixed to the tower for supplying electrical power to the BTS, the amplifier and the backhaul, such that a self-contained tower-top node is provided.

8. A communication network according to claim 7, wherein losses associated with coupling communication signals between the BTS and the amplifier, and between the amplifier and the antenna are reduced by at least 3 dB over a communication network not having a BTS and an amplifier affixed to the tower-top in a location proximal to the antenna.

9. A communication network according to claim 7, wherein the amplifier is capable of providing an outgoing communication signal from the antenna having a power of at least 39 dBm.

10. A communication network according to claim 7, further comprising a base station controller (BSC), and a backhaul affixed to the tower-top in a location proximal to the antenna, the backhaul configured to couple communication signals between the BTS and the BSC.

11. A communication network according to claim 10, wherein the backhaul is integrated with the BTS.

12. A communication network according to claim 10, wherein the backhaul is configured to couple communication signals between the BTS and the BSC via a wireless communication system.

13. In a communication network having an antenna supported on a top of a tower, a method for facilitating communication with a mobile station, the method comprising steps of:

providing a base transceiver station (BTS) affixed to the top of the tower in a location proximal to the antenna, the BTS having at least one transceiver configured to communicate with a mobile station through the antenna;

providing an amplifier affixed to the top of the tower in a location proximal to the antenna, the amplifier in a communication path between the BTS and the antenna, and separate and distinct from the BTS, the amplifier configured to amplify and filter communication signals passed between the BTS and the mobile station;

operating the at least one transceiver to communicate with the mobile station;

amplifying and filtering communication signals passed between the BTS and the mobile station, whereby losses associated with coupling communication signals between the BTS and the amplifier, and between the amplifier and the antenna are reduced over a communication network not having a BTS and an amplifier affixed to the top of the tower in a location proximal to the antenna; and supplying electrical power to the BTS, the amplifier and the backhaul from at least one photovoltaic cell affixed to the tower.

14. A method according to claim 13, wherein losses associated with coupling communication signals between the antenna and the BTS are reduced by at least 3 dB.

15. A method according to claim 13, wherein the step of amplifying and filtering communication signals passed between the BTS and the mobile station comprises the step of transmitting an outgoing communication signal from the antenna having a power of at least 39 dBm.

16. A method according to claim 13, wherein the communication network further comprises a base station controller (BSC), and a backhaul affixed to the top of the tower in a location proximal to the antenna and configured to couple communication signals between the BTS and the BSC, and wherein the method further comprises the step of coupling communication signals between the BTS and the BSC using the backhaul.

17. A method according to claim 16, wherein the backhaul is configured to couple communication signals between the BTS and the BSC via a wireless communication system, and wherein the step of coupling communication signals between the BTS and the BSC using the backhaul comprises the step of coupling communication signals between the BTS and the BSC via the wireless communication system.

* * * * *